(12) United States Patent  (10) Patent No.: US 7,563,032 B2
Nielson et al.  (45) Date of Patent: Jul. 21, 2009

(54) HARD COATING ON RUGGED VEE GROOVE CONNECTORS

(75) Inventors: Jeffrey D. Nielson, Wylie, TX (US); Matthew Cruz, Council Buffs, IA (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/765,294

(22) Filed: Jun. 19, 2007

(65) Prior Publication Data

US 2007/0292086 A1   Dec. 20, 2007

Related U.S. Application Data

(60) Provisional application No. 60/814,552, filed on Jun. 19, 2006.

(51) Int. Cl.
*G02B 6/36* (2006.01)
(52) U.S. Cl. ............................... 385/53; 385/95
(58) Field of Classification Search ................ 385/53, 385/95
See application file for complete search history.

(56) References Cited

U.S. PATENT DOCUMENTS

| | | | |
|---|---|---|---|
| 4,461,537 A | 7/1984 | Raymer, II et al. | |
| 5,076,656 A | 12/1991 | Briggs et al. | |
| 5,080,461 A | 1/1992 | Pimpinella | |
| 5,123,073 A | 6/1992 | Pimpinella | |
| 5,257,332 A | 10/1993 | Pimpinella | |
| 5,542,013 A | 7/1996 | Kaplow et al. | |
| 5,860,212 A * | 1/1999 | Matsuhira | 29/840 |
| 6,717,738 B2 * | 4/2004 | Yamada et al. | 359/642 |
| 6,937,406 B2 * | 8/2005 | Matsushima et al. | 359/819 |

* cited by examiner

*Primary Examiner*—Jennifer Doan
(74) *Attorney, Agent, or Firm*—Muncy, Geissler, Olds & Lowe, PLLC (57) ABSTRACT

A fiber optic connection is formed by a first connector including a first bench and a second connector. The first bench includes a first lens, an optical fiber in optical communication with the first lens, and a resting area. The first lens is attached to the first bench by an epoxy. The resting area is formed by a material having a hardness which is substantially equal to or greater than a hardness of a second lens which resides in the resting area when the second connector is mated to the first connector. The resting area can be formed by a hard layer over a softer material forming the remainder of the first bench. The epoxy may include additives which lower a thermal expansion coefficient of the epoxy.

31 Claims, 7 Drawing Sheets

HARD COATING ON RUGGED VEE GROOVE CONNECTORS

This application claims the benefit of U.S. Provisional Application No. 60/814,552, filed Jun. 19, 2006, the entire contents of which are herein incorporated by reference.

PRIOR OF THE INVENTION

1. Field of the Invention

The present invention relates to fiber optic connectors. More particularly, the present invention relates to fiber optic connectors with improved wear characteristics.

2. Description of the Related Art

Figure 15:
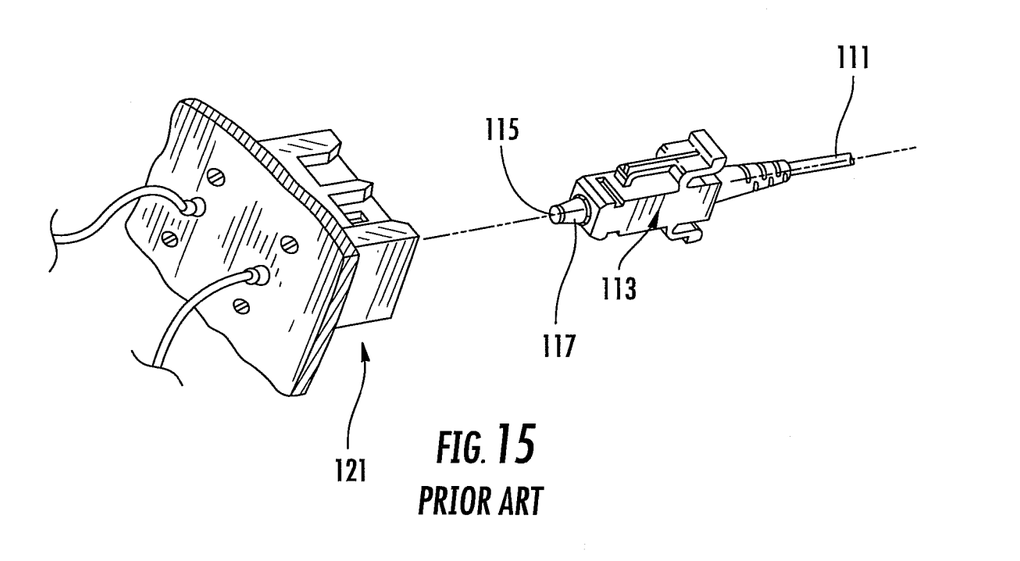
FIG. 15 is a perspective view of second types of fiber optic connectors, in accordance with the prior art.
Figure 16:
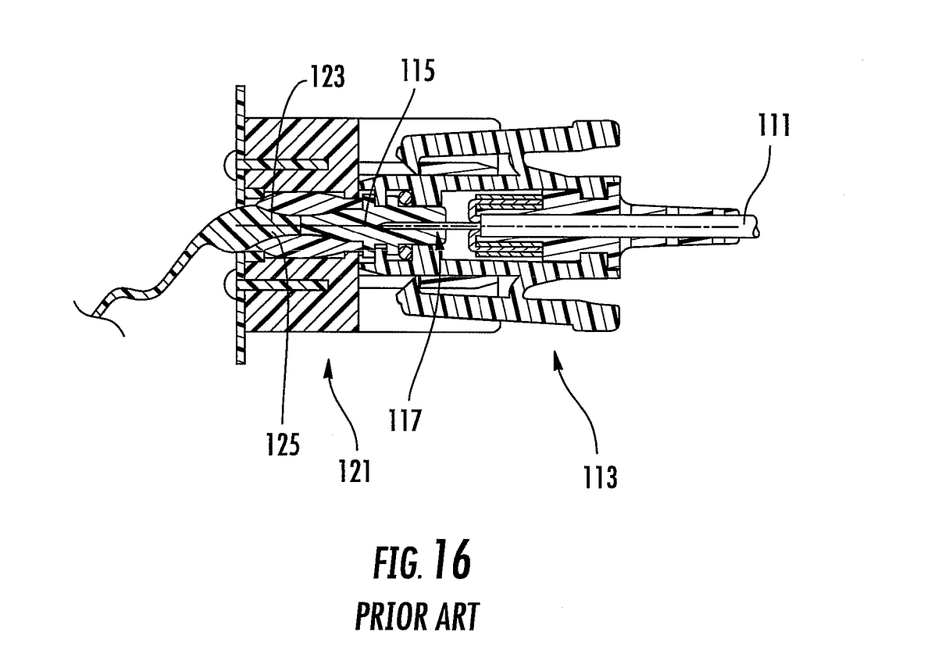
FIG. 16 is a cross sectional view illustrating a mating of the connectors of FIG. 15.
Figure 17:
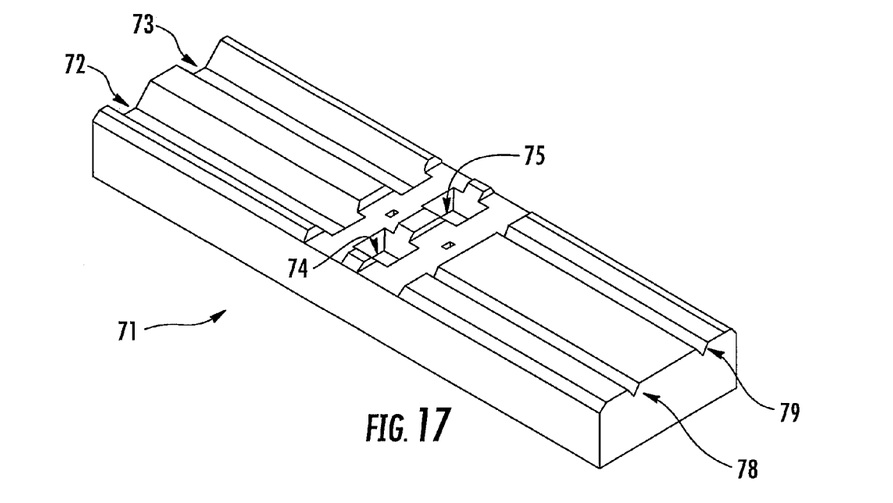
FIG. 17 is a perspective view of a first bench, in accordance with the present invention.
Figure 18:
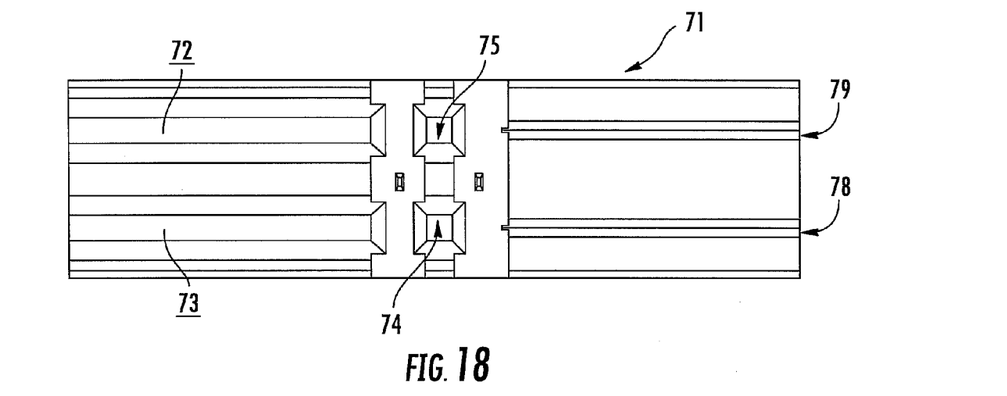
FIG. 18 is a top view of the first bench of FIG. 17.

In the prior art, various fiber optic connector designs are known. FIGS. 15 and 16 illustrate typical, mating fiber optic connectors. A fiber optic cable 111 passes into a first connector 113. Inside the first connector 113, a first optical fiber 115 of the fiber optic cable 111 passes through an opening within a first ferrule 117. The end of the first ferrule 117 has a hole therein to expose the end of the first optical fiber 115.

In the mating, second connector 121 (e.g., jack), a second optical fiber 123 passes through a central bore in a second ferrule 125. The end of the second ferrule 125 has a hole therein to expose the end of the second optical fiber 123.

When the first and second connectors 113 and 121 are mated, the ends of the first and second ferrules 117 and 125 abut one another and the end of the first optical fiber 115 is aligned with the end of the second optical fiber 123. For more detail concerning such mating connectors, reference can be made to U.S. Pat. No. 5,076,656, which is herein incorporated by reference.

The mating connectors of FIGS. 15 and 16 expose the ends of the first and second ferrules 117 and 125, and/or the ends of the optical fibers 115 and 123, to direct contact with each other. Therefore, the optical fiber ends can be damaged due to the physical contact. As a result, added effort must be expended to protect, clean and maintain the ferrule ends.

FIGS. 1-14 show mating v-groove connectors for fiber optic applications, also in accordance with the prior art. The mating connectors of FIGS. 1-14 can be found in U.S. Pat. No. 5,080,461, which is herein incorporated by reference. The mating connectors of U.S. Pat. No. 5,080,461 address several of the drawbacks of the mating fiber optic connectors of FIGS. 15 and 16 in that with the v-groove design, there is no physical contact between ends of ferrules or ends of the optical fibers. Further, the v-groove type mating connectors are well suited to simultaneously connect several optical fibers to mating optical fibers on a back plane on equipment. V-groove connectors are also illustrated in such U.S. Patents as U.S. Pat. Nos. 5,123,073, 5,257,332 and 5,542,013, each of which is herein incorporated by reference.

Since the present invention is an improvement applicable to all v-groove type connectors, and other connectors which operate on a similar principal, the Applicants will explain in detail the operation of one such connector in accordance with the prior art with particular reference to FIGS. 1-14.

Figure 1:
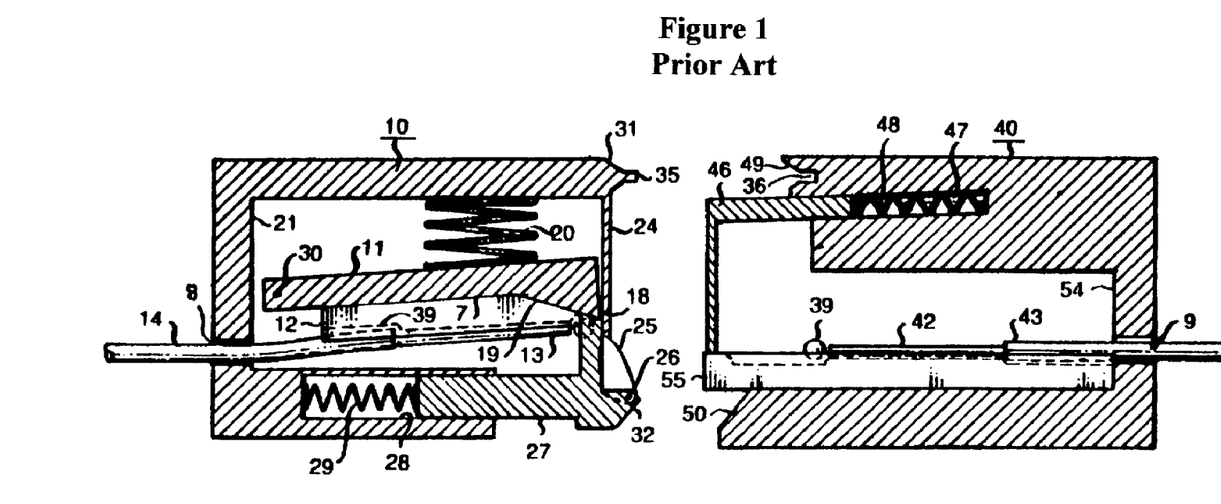
FIG. 1 is a cross sectional side view of left and right connectors in their unmated position, in accordance with the prior art.
Figures 6, 7:
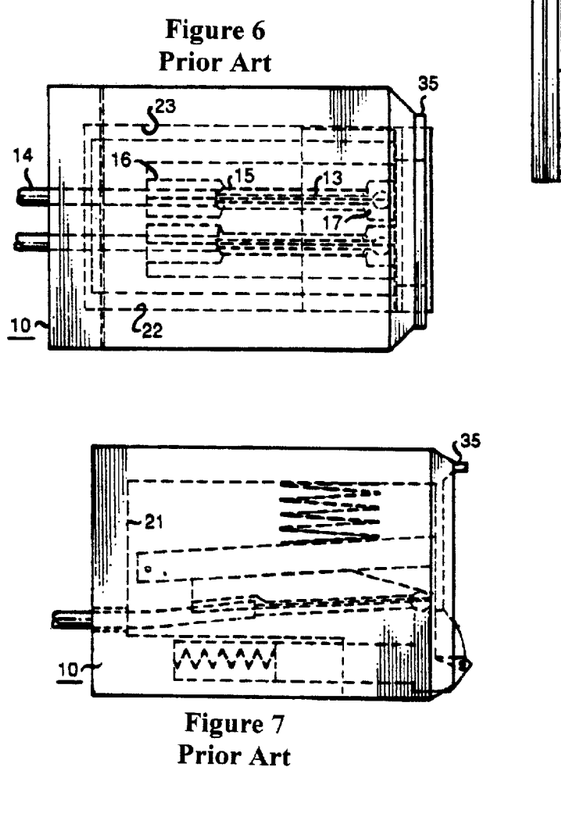
FIGS. 6, 7 and 8 are top, side and front views respectively of the left connector of FIG. 1.
Figure 8:
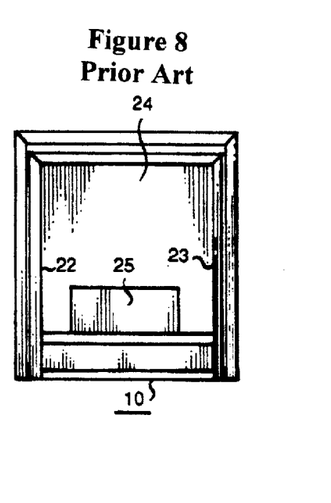

FIG. 1 shows two mating housings 10, 40, which are the "left" and "right" housings. Left housing 10 comprises a platform 11 pivotally mounted by pin 30 fixed in the sides 22, 23 of housing 10. The exterior surfaces of housing 10, as well as certain of the internal details, are shown in FIGS. 6, 7 and 8.

Referring now to FIGS. 1, 3, 4 and 5, a bench 12 mounts on the underside of platform 11. An optical fiber 14 extends through an entrance 8 in rear wall 21 of housing 10. Bench 12 includes one or more v-grooves 15 for receiving the unjacketed end of optical fiber 14. Two sets of grooves are shown formed in bench 12 in the illustrative example, for connecting two pairs of optical fibers; but more v-grooves could be provided to connect any number of fibers in a first set to mating fibers in a second set. The grooves 15, 16, 17 are seen in phantom in FIG. 6.

An extension 16 of each v-groove 15 receives a small length of the jacketed portion of fiber 14 to strain relieve the unjacketed portion. A lens 18 is affixed in a relatively deeper and wider v-groove 17 disposed at the end of the fiber groove 15. The diameter of lens 18 in relation to the depth of v-groove 17 places the center of lens 18 on the optic axis of the optical fiber positioned in the groove-containing surface of the bench 12.

Figures 9, 10, 11, 12:
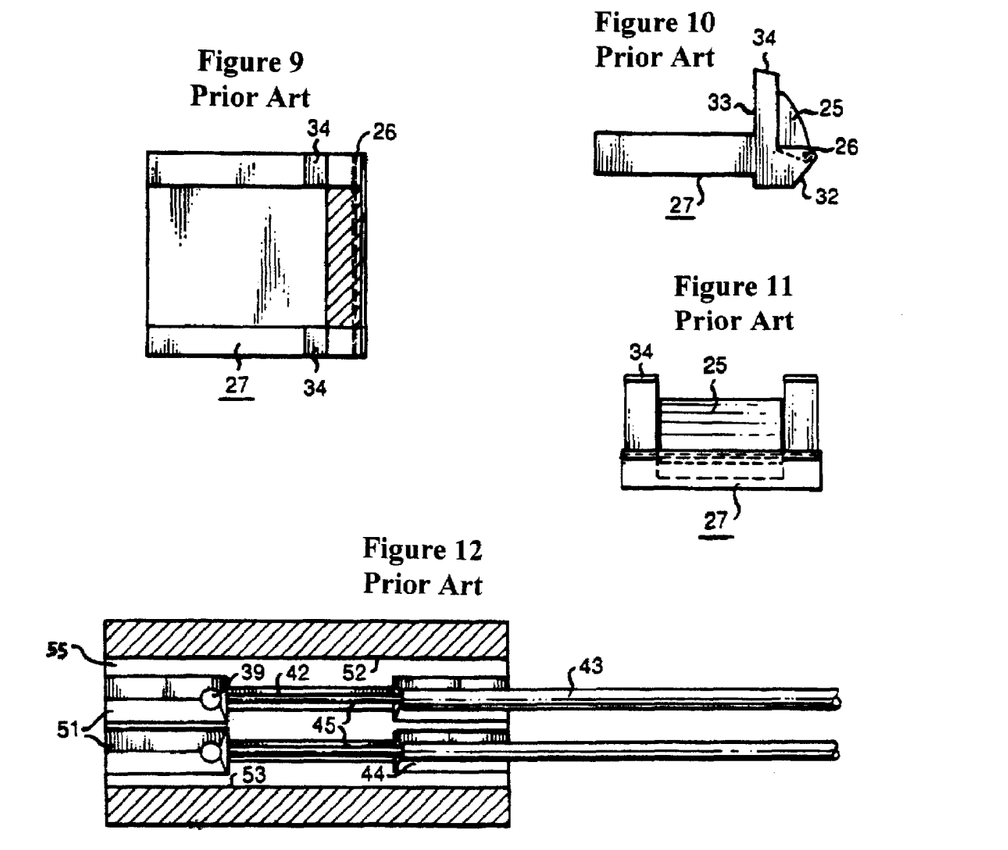
FIGS. 9, 10 and 11 are top, side and front views respectively of an actuator element and a door of the left connector of FIG. 1.
FIG. 12 is a top view of the groove-containing bench of the right connector of FIG. 1.

Right housing 40 includes sidewalls 52, 53, and a floor 50 supporting a bench 55, in which is formed fiber v-grooves 45 as seen in FIG. 12. Fiber 43 enters housing 40 through a fiber entrance 9 in the rear wall 54. An enlarged v-groove 44 receives the jacketed end of fiber 43. A recessed v-groove 51 which serves the same purpose as v-groove 17, contains a fixedly mounted alignment lens 39. The diameter of lens 39 in relation to the depth of v-groove 51 is such that the center of lens 39 is on the optic axis defined by the core of the fiber 42 and the depth of the fiber groove 45.

The alignment lens 18 and alignment lens 39 are affixed in position in their respective v-grooves 17 and 51 by an index-matching epoxy compound. The index-matching epoxy compound also provides for a low loss transmission channel between the fiber end and the lens's surface.

Right housing 40 includes a retracting entrance door 46 which mounts in a door slide 47. When the housings 10 and 40 are not mated, door 46 is biased into a forward direction by action of spring 48. In this position, door 46 closes the entrance to the interior of housing 40.

Similarly, left housing 10 has an access door 25, which permits access to the interior of housing 10. Door 25 is mounted on the foot 32 of actuator 27 by pivot pin 26, as seen in FIG. 10. When housing 10 is not mated to housing 40, the entrance to the interior of housing 10 is sealed by door 25.

The actuator 27, shown in further detail in FIGS. 9, 10 and 11, slidably mounts in a cavity 28 formed in the bottom of housing 10. Actuator 27 is normally biased in a forward position against the interior side of front wall 24 of housing 10. Contact of the door 25 and foot 32 with the end surface 55 and 50 respectively of right housing 40 during the mating of the two housings 10, 40, causes movement inwardly of the actuator 27. This results in relative movement of ramp 19 and the post surfaces 34 on which the ramp 19 rests. By this action, the platform 11 and the optical fibers supported on bench 12 attached thereto are raised or lowered as actuator 27 moves in and out of the cavity 28.

Figure 2:
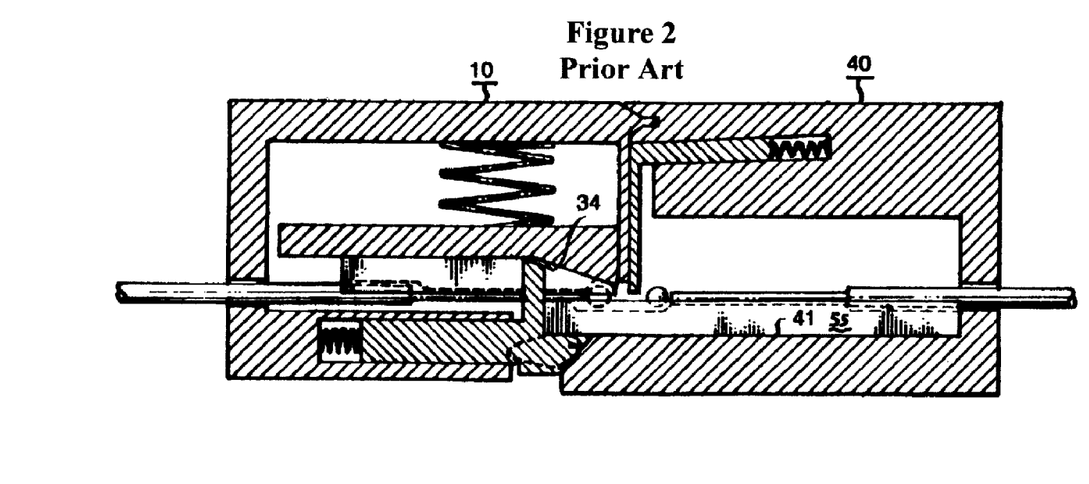
FIG. 2 is a cross sectional side view of the two connectors of FIG. 1 in their mated position.
Figure 3:
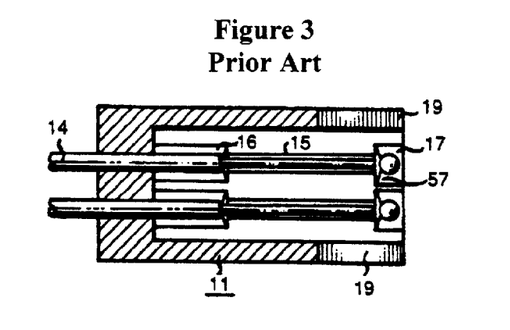
FIGS. 3, 4 and 5 are a bottom view, side view and front view respectively of the fiber-containing subassembly of the left connector of FIG. 1.
Figure 4:
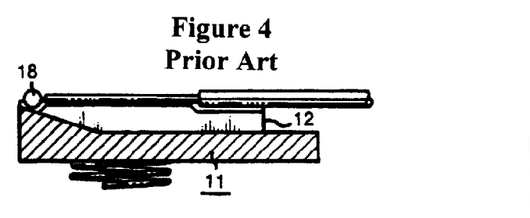
Figure 5:
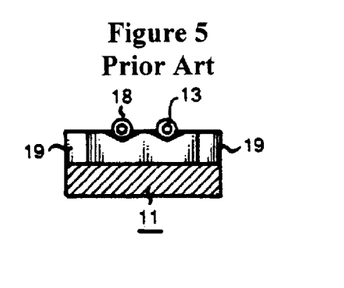

In the position shown in FIG. 1, the platform 11 is supported in a raised or retracted position, in which the fiber end is disposed upwardly in the interior of housing 10. As actuator 27 enters the cavity 28, the ramp 19 of platform 11 moves downward under the bias of loading spring 20 pressing on the topside of platform 11. The fiber 13 thereby is lowered toward the plane of the top surface of the lower interior floor of housing 10. Toward the end of the travel of actuator 27, alignment lens 18 of the left housing 10 engages alignment groove 51 in the bench 55 of the right housing 40 and optically aligns with the alignment lens 39. In this position, the alignment lens 18 is situated in optical alignment with the alignment lens 39, with both residing in the grooves 51, as depicted in FIG. 2. To assure that lens 18 fully engages in the groove 51, it is advantageous to allow a slight additional amount of travel of the actuator 27.

The platform 11 should be mounted on its pivot pin 30 within the interior of housing 10 with a certain amount of freedom of movement in the direction of the pivot pin axis. The freedom will allow the platform 11 to adjust if, during mating, the lens 18 does not happen to align with its center precisely in the plane that bisects the v-groove 51. In such a case, the lateral freedom will allow the lens 18 to seek out the v-groove sides and thereby assume its desired alignment.

As seen in FIG. 2, to effect a fully protective end seal as the left and right housings 10 and 40 mate, the front ends of the side walls 22, 23 of housing 10 close onto the front ends of the side walls 52, 53 of housing 40, with beveled surface 31 abutting stop 49 on housing 40. The beveled foot 32 of housing 10 closes onto a lower stop 50 of housing 40.

It is also useful to assure that the housings 10, 40 resist relative motion in a plane normal to the fiber axes. Such motion could, for example, be caused by vibration. Accordingly, pursuant to another aspect of the invention, an alignment finger 35 seen in FIG. 7 is formed on the upper guide surface 31 of housing 10. Finger 35 closely engages into the mating alignment slot 36 of housing 40, thus preventing the grooves containing the mating fibers from vibrating out of alignment.

In the mating connectors 10, and 40 of FIGS. 1-14, it is not critical to maintain a very precise separation between the alignment lenses 18 and 39, when both lenses are disposed in groove 51. This is due to the fact that the radii of the lenses 18 and 39 and the distance of the lenses from the light-emitting ends of the respective fibers 14 and 42 are carefully set and thereafter fixed with epoxy, to assure that light entering a lens from the adjacent fiber travels in parallel rays.

The epoxy should have an index of refraction that matches the refractive indices of the glass fiber core and the alignment lens. Matching the refractive indexes allows the epoxy to be extended advantageously around the lenses 18 and 39 and the fiber ends, an expedient that reduces the incidence of loss at the point of connection. The lenses 18 and 39 may be ball-shaped and formed of sapphire and in this embodiment are 300 microns in diameter. The fiber-to-lens surface separation is about 85 microns.

FIGS. 1-14 illustrate one or two optical fibers contained in each of the housings 10 and 40. However, a multiplicity of optical fibers can be accommodated in each housing 10 and 40 to effect a gang connection. In this application, particularly if fibers of more than one diameter are present in the gang connection, it is advantageous to mount the individual fibers on separate pivot arms or subassemblies in the left housing 10. Independent mounting allows variation in alignment lens diameter associated with each fiber contained in the left housing 10 to seek out its own position in the alignment grooves 51 of the right housing 40.

Figure 13:
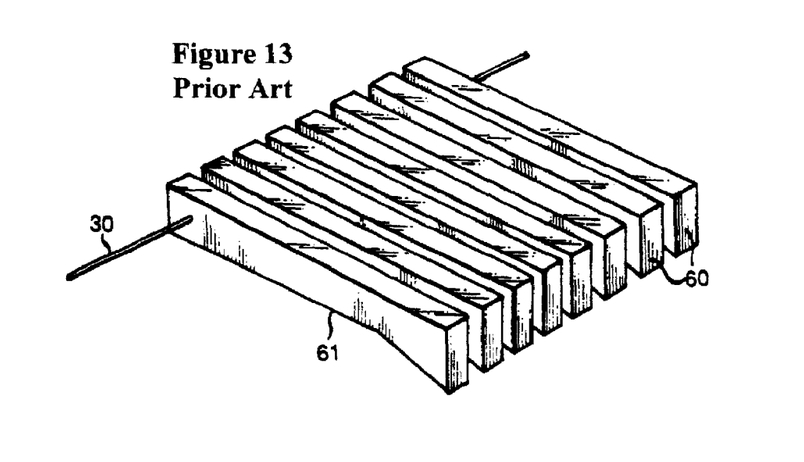
FIG. 13 is a schematic perspective sketch of an alternative gang-type multi fiber-containing subassembly for the left connector of FIG. 1.
Figure 14:
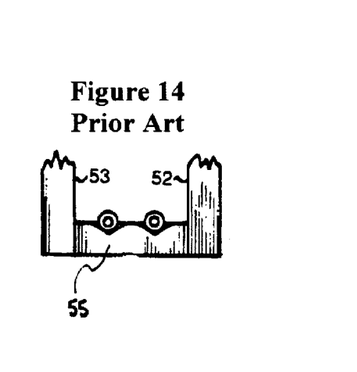
FIG. 14 is a front view of the right connector of FIG. 1.

To illustrate, FIG. 13 shows an array of arms, each denoted 60, and each serving the fiber-mounting purpose of the platform 11. Each arm 60 includes a bench 61 that is formed with a fiber groove and a v-groove recess for an alignment lens (not shown), as has been described above with respect to platform 11 and bench 12. Like the platform 11, each arm 60 is biased downward by a spring (not shown) such as spring 20. Each arm 60 functions substantially the same as the platform 11/bench 12 structure illustrated in FIGS. 1 and 2, to allow individual fibers and their associated alignment lenses to be guided into alignment grooves contained on a bench in a mating housing 40. Alternatively, magnetic, electromagnetic, or shape memory alloy actuators can be used in place of the mechanical spring 20.

SUMMARY OF THE INVENTION

The Applicants have discovered several drawbacks associated with the prior art fiber optic connectors as detailed above.

With the connectors of FIGS. 15 and 16, if the connector is employed in an environment which is prone to vibration, the chance of damage between the physically contacting ferrules and/or optical fiber ends is greatly increased. Also, there is a risk that the first and second ferrules will become misaligned over time due to vibrations causing the connector to fail to operate, as the optical fiber ends must be precisely aligned.

The Applicants have also appreciated drawbacks with the connectors of FIGS. 1-14. Particularly, excessive wear may occur in the v-groove 51 of the bench 55 if the connector is employed in an environment which is prone to vibration. Also, excessive wear in the v-grooves 51 of the bench 55 can occur due to repeated plugging in and disconnecting of the left and right connectors 10 and 40.

When the left and right connectors 10 and 40 are mated, the second lens 18 of the left connector 10 comes face-to-face with the first lens 39 of the right connector 40, with an air gap therebetween. The second lens 18 bears against the v-groove 51 of the first bench 55 of the right connector 10 under the biasing pressure of the spring 20.

The contact points between the second lens 18 and the v-groove 51 is susceptible to relative movement. Vibration in the left and/or right connectors 10 and 40 will translate into slight movements between the second lens 18 and the v-groove 51. Vibration in the left and/or right connectors 10 and 40 is a common occurrence when the connectors are employed in a vehicle, e.g. truck, ship, aircraft, and/or attached to industrial factory equipment.

The first and second lenses 39 and 18 are typically made of a relatively hard substance, such as sapphire. The first bench 55 is typically made of a substance which is less hard, such as silicon. When the second lens 18 vibrates against, or reciprocates along, the v-groove 51, wear occurs on the surface of the v-groove 51. The material removed from the v-groove 51 due to the wear manifests itself as dust and debris.

The dust and debris is generated close to the first and second lenses 39 and 18, as the second lens 18 causes the wear and the first lens 39 is closely spaced to the second lens 18 when the left and right connectors 10 and 40 are mated. Therefore, it is common that the dust and debris will be present on a surface of the first and/or second lenses 39 and 18 and interfere with the light being transmitted between the first and second lenses 39 and 18. The decreased light intensity can lead to communication errors in the overall system due to a poor optical connection inside of the mated connectors 10 and 40.

Moreover, the first bench 55 is accurately machined to a high tolerance, so that the first and second lenses 39 and 18 will be properly aligned when the left and right connectors 10 and 40 are mated. The accurate alignment is intended to maintain the light intensity as the light passes through the lenses 39 and 18 of the mated connectors. When the second lens 18 wears the surface of the v-groove 51, the second lens 18 tends to "seat" into the worn spots. This "seating" of the second lens 18 causes a misalignment between the first lens 39 and the second lens 18. The misalignment further reduces the intensity of the light transmitted through the mated connectors 10 and 40. If the light level drops below a certain threshold (depending upon the equipment involved), communication signals may cease to be recognized, i.e., a disconnect situation.

It is an object of the present invention to address one or more of the drawbacks of the prior art connectors and/or Applicants' appreciated needs in the art.

These and other objects are accomplished by a fiber optic connection formed by a first connector including a first bench and a second connector. The first bench includes a first lens, an optical fiber in optical communication with the first lens, and resting area. The first lens is attached to the first bench by an epoxy. The resting area is formed by a material having a hardness which is substantially equal to or greater than a hardness of a second lens which resides in the resting area when the second connector is mated to the first connector. The resting area can be formed by a hard layer over a softer material forming the remainder of the first bench. The epoxy may include additives which lower a thermal expansion coefficient of the epoxy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIGS. 17-24 illustrate a bench 71 in accordance with the present invention. The bench 71 includes first and second resting areas, such as large v-grooves 72 and 73, which are sized and shaped to support a pair of second lens associated with a second bench, like the lens 18 of the bench 12 of the prior art in FIG. 1.

Figure 19:
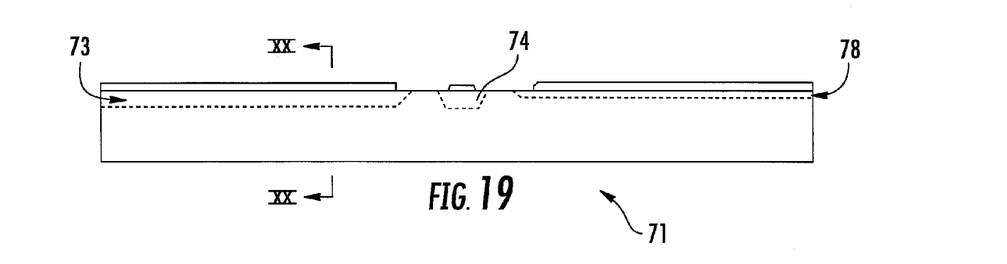
FIG. 19 is a side view of the first bench of FIG. 17.
Figure 22:
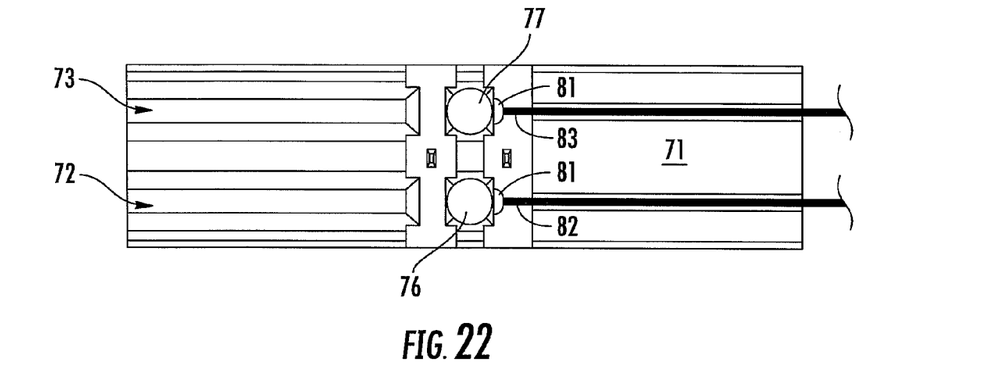
FIG. 22 is a view similar to FIG. 18, but illustrating a pair of first lenses connected to the first bench and also connected to a pair of optical fibers.

The first and second large v-grooves 72 and 73 are aligned with first and second indentations 74 and 75. The depth of the indentations 74 and 75 is approximately the same as the depth of the first and second large v-grooves 72 and 73, as best seen in FIG. 19. The first and second indentations 74 and 75 are sized and shaped to hold spherical, sapphire lens 76 and 77, as best illustrated in FIG. 22.

The first bench 71 also includes first and second small v-grooves 78 and 79. The first and second small v-grooves 78 and 79 are also aligned with first and second indentations 74 and 75 and with the first and second large v-grooves 72 and 73, but are on opposite sides of the first and second indentations 74 and 75. The first and second small v-grooves 78 and 79 are formed to a more shallow extent in the first bench 71, as compared to the first and second large v-grooves 72 and 73.

The first and second lens 76 and 77 are attached to the first bench 71 by an epoxy 81'. The epoxy 81' adheres the first and second lens 76 and 77 into the first and second indentations 74 and 75. An index matching epoxy 81 attaches the first and second lens 76 and 77 to first and second optical fibers 82 and 83.

Figure 23:
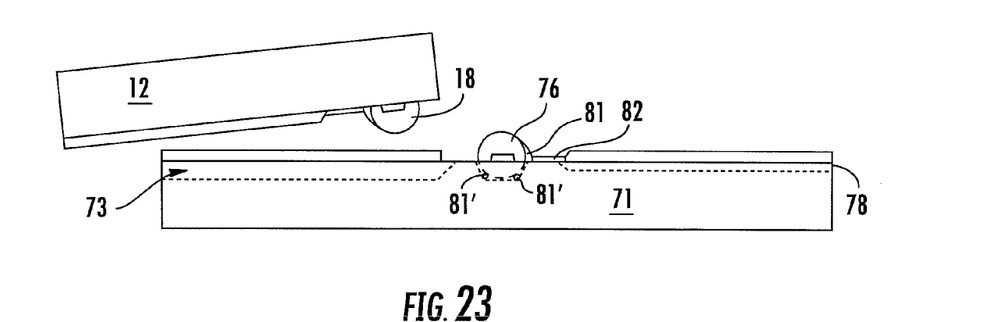
FIG. 23 is a side view of the first bench of FIG. 22 and a second bench just prior to mating.
Figure 24:
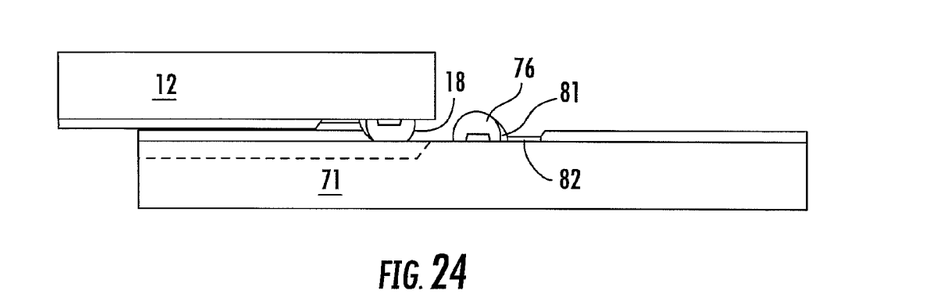
FIG. 24 is a side view of the first and second benches of FIG. 23 in a mating position.

As best illustrated in FIGS. 23 and 24, when the second bench 12 is mated to the first bench 71, the second lenses 18 of the second bench 12 will nest into the first and second large v-grooves 72 and 73. The second lenses 18 will nest in the first and second large v-grooves 72 and 73 toward the ends of the large v-grooves 72 and 73, closest to the first and second indentations 74 and 75. However, there will be respective air gaps between the first lenses 76 and 77 and the corresponding second lenses 18.

Figure 20:
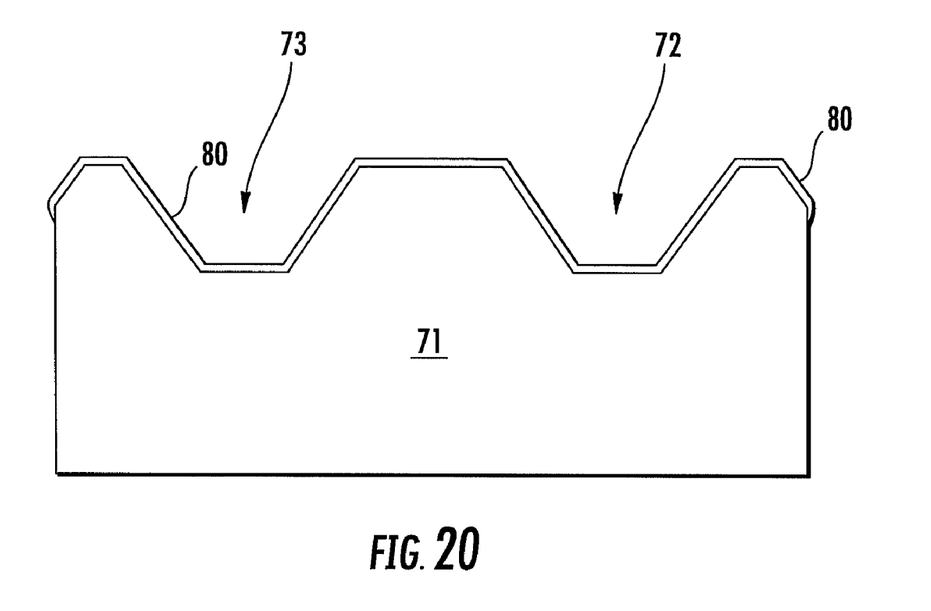
FIG. 20 is a cross sectional view taken along line XX-XX in FIG. 19.

As best seen in the cross sectional view of FIG. 20, a hard layer, such as a coating 80, has been applied to the top surface of the first bench 71. The hard coating 80 has a hardness which is greater than a hardness of the material used to form the first bench 71, and may be a diamond-like coating (DLC), amorphous carbon, titanium nitride, hard chrome or silicon dioxide. Other types of hard coatings 80 are also within the purview of the present invention. Preferably, a thickness of the coating 80 is less than 7 microns, more preferably between 2 to 7 microns, and most preferably about 5 microns.

The coating 80 may be applied over the entire top surface of the first bench 71, as illustrated in the cross section of FIG. 20, e.g. the coating 80 could be omitted on at least the bottom surface of the first bench 71 and possibly on the side walls of the first bench 71. In this instance, many first benches 71 may be placed on a tray and coated at a single time from an overhead spray.

Figure 21:
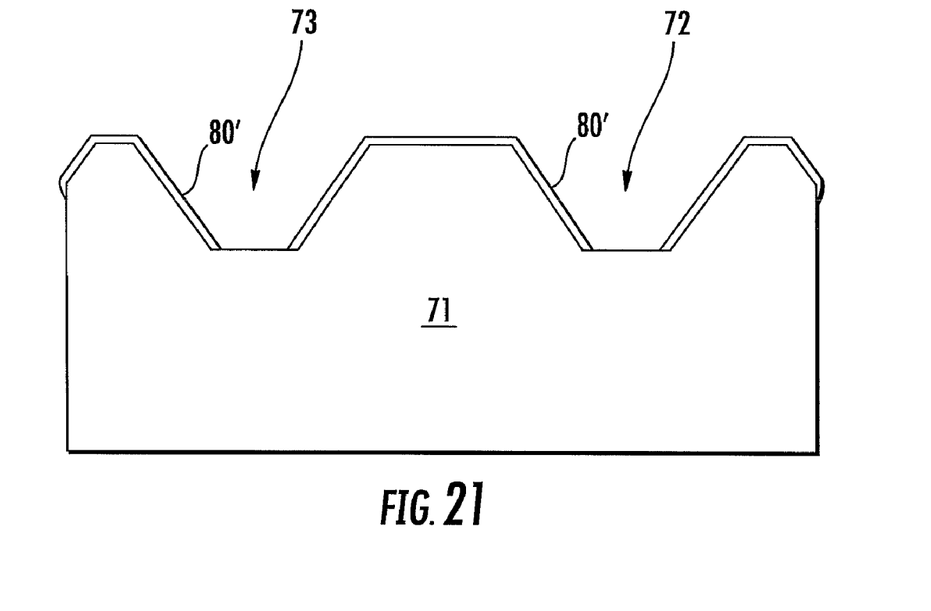
FIG. 21 is a cross sectional view similar to FIG. 20, illustrating an alternative embodiment of the present invention.

As illustrated in the alternative embodiment depicted in FIG. 21, the coating 80' could be applied to only portions of the first bench 71 subject to wear. In the alternative embodiment of FIG. 21, the expense of the coating material in areas of the bench not subjected to wear is avoided. In a preferred embodiment, the hardness of the coating 80, 80' is substantially equal to or greater than a hardness of the material forming the first and/or second lens.

The coating 80 or 80' greatly improves the connector performance, as will be further addressed hereinafter. However, a further improvement of the present invention will now be described.

The v-groove connector of the present invention should accommodate temperatures of −65 degrees Celsius to +125 degrees Celsius without failure in order to meet certain standards requirements. The Applicants noted that the typical prior art epoxy used to attach the first and second lenses 39 and 18 to the first and second benches 55 and 12 in the prior art connectors 10 and 40 had an increased failure rate when the first bench 71 of the present invention included the coating 80 or 80' during thermal testing. Applicants believe that the failure occurred during the low temperature testing phase and that approximately 1 in 10 samples failed.

The typical epoxy used in the prior art has a thermal expansion coefficient of approximately 50. Applicants added quartz particles to the typical epoxy to form a modified epoxy 81'. The quartz particles had a thermal expansion coefficient which was negative, e.g. approximately negative 7. Applicants added the quartz particles until the epoxy/quartz particle mixture had a thermal expansion coefficient which had been reduced by at least 10, as compared to the epoxy's initial thermal expansion coefficient. In a one embodiment, the thermal expansion coefficient was lowered to approximately 30. The modified epoxy 81' improved the adhesion of the first and second lens 76 and 77 to the first bench 71, such that no failures occurred in the samples tested with the modified epoxy 81', during the temperature testing between −65 degrees Celsius and +125 degrees Celsius.

Besides the thermal testing above, Applicants conducted other tests comparing left and right connectors employing the first bench 71 and modified epoxy 81' of the present invention to the left and right connectors with an uncoated silicon first bench, in accordance with the prior art connectors. A first test was a durability test. In the durability test, one connects and disconnects the left and right connectors two hundred times. Then, the left and right connectors are disassembled and inspected for wear.

The Applicants also conducted a wear test. In the wear test, the left and right connectors of the present invention and the left and right connectors of the prior art are mated. The connectors are then attached to a shaker table and subjected to shaking at 22 Gs. The shaking occurs over a thirty hour period, with ten hours dedicated per each axis of direction X, Y and Z. Then, the left and right connectors of the present invention and the left and right connectors of the prior art were disassembled and inspected for wear.

The connectors of the present invention showed remarkable improvements over the connectors of the prior art. In fact, the connectors of the present invention showed no evidence of wear, whereas failures occurred in the connectors of the prior art. "Failures" are defined as a drop of more than 0.5 dB in signal strength on at least one channel of the connector due to the effects of the testing.

Because of the high failure rate of the convention v-type connectors, they are not well-suited for use in vibration prone environments, such as in aircraft, land vehicles, ships, and industrial factory equipment. By the improvements of the present invention, the improved v-groove connectors are now much more suitable for use in environments prone to vibration.

Applying a hard coating to a bench formed of a softer material, like silicon, is the preferred embodiment of the present invention. It is typically easier to form the grooves in silicon using a photolithography machining process to a +/−0.5 micro resolution. However, several of the benefits of the invention could be achieved by forming the entire first bench of a hard material, e.g. a material having a hardness which is substantially equal to or greater than a hardness of the lens to contact the v-groove in the first bench.

Although one particular structural arrangement for the mating connectors has been illustrated in the drawings, other connector mating structures could be employed. For example, connectors with differently structured shutter doors, or no shutter doors, could employ one or more of the inventive aspects (e.g. hard bench and/or modified epoxy) of the present invention. Further, connectors with differently structured interlocks or latching devices or differently shaped grooves could employ one or more of the inventive aspects of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic connector comprising;
   a bench formed of a first material having a first hardness;
   a resting area formed in said bench shaped to seat a second lens of a connectable and disconnectable mating connector; and
   a second material overlying at least said resting area of said bench, such that the second lens of the mating connector rests against said second material within said resting area of said bench when the mating connector is connected to said fiber optic connector, wherein said second material has a second hardness which is greater than the first hardness.

2. The fiber optic connector of claim 1, further comprising:
   a first lens attached to said bench adjacent to said resting area, said first lens being formed of a third material having a third hardness, wherein said second hardness is substantially equal to or greater than said third hardness.

3. The fiber optic connector of claim 2, wherein said third material includes sapphire.

4. The fiber optic connector of claim 2, wherein said first lens is spherical in shape.

5. The fiber optic connector of claim 1, wherein said resting area is formed by a v-shaped groove in a top surface of said bench.

6. The fiber optic connector of claim 5, wherein said top surface of said bench includes a plurality of v-shaped grooves shaped to seat a plurality of lens of the mating connector.

7. The fiber optic connector of claim 1, wherein said first material includes silicon.

8. The fiber optic connector of claim 1, wherein said second material is a coating layer.

9. The fiber optic connector of claim 8, wherein said coating layer has a thickness which is less than about 7 microns.

10. The fiber optic connector of claim 8, wherein said coating layer has a thickness between about 2 microns and about 7 microns.

11. The fiber optic connector of claim 8, wherein said resting area is included in a top surface of said bench and said coating layer is present over an entirety of said top surface of said bench.

12. The fiber optic connector of claim 1, wherein said second material is an amorphous carbon.

13. The fiber optic connector of claim 1, wherein said second material is selected from the group consisting of titanium nitride, amorphous carbon, hard chrome and silicon dioxide.

14. A fiber optic connector comprising;
   a bench;
   a first lens attached to said bench;
   an optical fiber communicating optical signals to said first lens; and
   a resting area formed in said bench proximate said first lens, said resting area being shaped to seat a second lens of a connectable and disconnectable mating connector, wherein said resting area is formed of a material having a hardness which is substantially equal to or greater than a hardness of said first lens.

15. The fiber optic connector of claim 14, wherein said resting area is formed by a v-shaped groove within said bench.

16. The fiber optic connector of claim 15, wherein said v-shaped groove is a first v-shaped groove, and wherein said bench includes at least a second v-shaped groove to seat another lens of the mating connector.

17. The fiber optic connector of claim 14, wherein said bench is formed of silicon with a hard layer provided on at least a portion of an outer surface of said silicon including said resting area.

18. The fiber optic connector of claim 17, wherein said hard layer has a thickness which is less than about 7 microns.

19. The fiber optic connector of claim 17, wherein said hard layer has a thickness between about 2 microns and about 7 microns.

20. The fiber optic connector of claim 17, wherein said resting area is included in a top surface of said bench and said hard layer is present over an entirety of said top surface of said bench.

21. The fiber optic connector of claim 17, wherein said hard layer is a coating selected from the group consisting of titanium nitride, amorphous carbon, hard chrome and silicon dioxide.

22. A fiber optic connector comprising:
   a bench;
   an optical fiber supported by said bench;
   a lens supported by said bench, said lens being in optical communication with said optical fiber; and
   an epoxy connecting said lens to said bench, wherein said epoxy includes additives which lower a thermal expansion coefficient of said epoxy.

23. The fiber optic connector of claim 22, wherein said epoxy with said additives has an overall thermal expansion coefficient of approximately 30.

24. The fiber optic connector of claim 22, wherein said additives are quartz particles.

25. The fiber optic connector of claim 22, wherein said additives alone have a negative thermal expansion coefficient.

26. The fiber optic connector of claim 22, wherein said additives lower the thermal expansion coefficient of said epoxy by at least 10 as compared to the same epoxy without said additives.

27. Mating connectors comprising:
a first connector including:
- a first bench;
- a first lens attached to said first bench;
- a first optical fiber communicating optical signals to said first lens; and
- a resting area formed in said first bench proximate said first lens; and a second connector including:
- a second bench;
- a second lens attached to said second bench; and
- a second optical fiber communicating optical signals to said second lens, wherein when said first connector is mated to said second connector, said second lens abuts said resting area of said first bench, and wherein said resting area is formed a material having a hardness which is substantially equal to or greater than a hardness of said second lens.

28. The mating connectors of claim 27, wherein said first bench includes an outer layer formed of said material having the hardness which is substantially equal to or greater than the hardness of said second lens, and said resting area is formed on said outer layer.

29. The mating connectors of claim 28, wherein said first bench is formed of silicon and said outer layer is formed of a material selected from the group consisting of titanium nitride, amorphous carbon, hard chrome and silicon dioxide.

30. The mating connectors of claim 27, wherein said resting area is formed by a v-shaped groove within said first bench, and said v-shaped groove is shaped to seat said second lens of said second connector.

31. Mating connectors comprising:
a first connector including:
- a first bench formed of a first material having a first hardness;
- a first lens attached to said first bench;
- a first optical fiber supported by said first bench communicating optical signals to said first lens;
- an epoxy connecting said first bench to said first lens, wherein said epoxy includes additives which lower a thermal expansion coefficient of said epoxy;
- a resting area formed in said first bench proximate said first lens; and
- a second material overlying at least said resting area of said first bench, wherein said second material has a second hardness which is greater than the first hardness; and a second connector including:
- a second bench;
- a second lens attached to said second bench; and
- a second optical fiber communicating optical signals to said second lens, wherein said resting area is shaped to seat said second lens of said second connector, and wherein when said first connector is mated to said second connector, said second lens abuts said resting area of said first bench, and wherein said second material has a hardness which is substantially equal to or greater than a hardness of said first lens and substantially equal to or greater than a hardness of said second lens.

* * * * *